(12) United States Patent
Blair

(10) Patent No.: US 10,609,918 B2
(45) Date of Patent: Apr. 7, 2020

(54) REMOTE-CONTROLLED FISHING BOBBER

(71) Applicant: Billie K. Blair, Georgetown, KY (US)

(72) Inventor: Billie K. Blair, Georgetown, KY (US)

( * ) Notice: Subject to any disclaimer, the term of this patent is extended or adjusted under 35 U.S.C. 154(b) by 0 days.

(21) Appl. No.: 16/264,660

(22) Filed: Jan. 31, 2019

(65) Prior Publication Data
US 2019/0289839 A1 Sep. 26, 2019

Related U.S. Application Data

(60) Provisional application No. 62/645,635, filed on Mar. 20, 2018.

(51) Int. Cl.
*A01K 93/00* (2006.01)
*A01K 91/00* (2006.01)

(52) U.S. Cl.
CPC .............. *A01K 93/00* (2013.01); *A01K 91/00* (2013.01)

(58) Field of Classification Search
CPC ................................. A01K 91/00; A01K 93/00
USPC ........................................................... 43/26.1
See application file for complete search history.

(56) References Cited

U.S. PATENT DOCUMENTS

| | | | | |
|---|---|---|---|---|
| 3,758,975 A * | 9/1973 | Curtis | ................. | A01K 91/065 43/26.1 |
| 4,638,585 A * | 1/1987 | Korte | ..................... | A01K 91/02 43/26.1 |
| 5,086,581 A * | 2/1992 | Barra | ..................... | A01K 91/02 43/26.1 |
| 5,293,712 A * | 3/1994 | Lo | ........................... | A01K 91/02 43/26.1 |
| 5,557,878 A * | 9/1996 | Ross | ...................... | A01K 91/20 43/43.11 |
| 6,138,398 A * | 10/2000 | Livingston | ............. | A01K 93/02 43/17 |
| 6,263,611 B1 * | 7/2001 | Kimura | .................. | A01K 91/02 43/26.1 |
| 6,389,732 B1 * | 5/2002 | Daniel | ................... | A01K 91/02 43/26.1 |
| 8,387,303 B2 * | 3/2013 | Abraham | ............... | A01K 85/01 43/26.1 |
| 8,627,593 B1 * | 1/2014 | Schepp | ................... | A01K 93/00 43/26.1 |
| 9,532,558 B2 * | 1/2017 | Hamilton, II | ........ | A01K 89/015 |
| 2005/0102883 A1 * | 5/2005 | Temes | .................... | A01K 91/02 43/26.1 |
| 2011/0138675 A1 * | 6/2011 | Cutts | ....................... | A01K 91/02 43/4 |
| 2017/0356211 A1 * | 12/2017 | Rejniak | ................. | E04H 4/1654 |
| 2018/0279594 A1 * | 10/2018 | Raskas | ................... | A01K 83/00 |

* cited by examiner

*Primary Examiner* — Claude J Brown
(74) *Attorney, Agent, or Firm* — Malone IP Law; Steven J. Malone

(57) ABSTRACT

The invention presented is a remote-controlled fishing bobber system. The fishing bobber is made up of a bottom portion being independently rotational from a top portion. The bottom portion of the bobber has a through channel connecting two ports on opposing sides. One or more protective screens protect the through channel. The system includes a propelling system with a pump, a motor, a control circuitry, a battery, and a remote control. A reverse motor direction causes the independent rotation of the bottom portion from the top portion by engaging a gear system.

19 Claims, 6 Drawing Sheets

REMOTE-CONTROLLED FISHING BOBBER

RELATED APPLICATIONS

This application claims priority to U.S. Provisional Patent No. 62/645,635 filed on Mar. 20, 2018, the disclosure of which is hereby incorporated by express reference thereto.

FIELD OF THE INVENTION

The present invention discloses a remote-controlled fishing bobber with propelling abilities.

BACKGROUND

The fishing sport is a relaxing pastime; however, a few frustrations occur with beginning and experienced fishermen alike. Fishing involves casting a line and hook into a certain place in the water to lure and catch fish. Beginning fishermen often have difficulty directing a cast to the desired location in the water surface. Wind, nearby trees and bushes, and other things can cause additional difficulty in casting. Another complication with placing a line and hook in a fish inhabited location is water currents that cause a fishing line to drift.

SUMMARY

The invention presented is a remote-controlled fishing bobber system. The fishing bobber is made up of a bottom portion being independently rotational from atop portion. The bottom portion of the bobber has a through channel connecting two ports on opposing sides. One or more protective screens protect the two ports. The system includes a propelling system with a pump, a motor, control circuitry, a battery, and a remote control.

The top portion of the bobber or the bottom portion or both portions may be hemispherical. The top portion of the bobber may be air-tight and may float above the water surface. The motor, control circuitry, and battery may be located in the air-tight, bottom portion of the bobber. The top portion may include a connector to attach to a fishing line. The bottom portion may include a gear strip on the inside of the top of the bottom portion.

The pump may be located in the through channel and may include at least two speed options controlled by the remote. The remote may be a physical control piece included in the purchase of the fishing bobber system, or it may be a downloadable app to an electronic device.

The independent rotation of the bottom portion from the top portion may be controlled by the remote by measured degree amounts. The remote control may control the direction of the motor. The motor in reverse may power the independent rotation of the bottom portion from the top portion of the fishing bobber using a motor gear, a power gear and the bottom portion gear strip. The battery and control circuitry may remain stationary with the motor and pump and may not rotate with the independent rotation of the bottom portion from the top portion of the fishing bobber. The through channel may rotate with the independent rotation of the bottom portion from the top portion of the fishing bobber and may rotate around the pump. The pump and motor may remain stationary in relation to the independent rotation of the bottom portion from the top portion of the fishing bobber.

The two ports located in the bottom portion of the bobber on opposing sides may be of equal size and shape. They may be covered by the one or more protective screens. The one or more protective screens may act as filters and may allow water to pass through freely while blocking debris.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
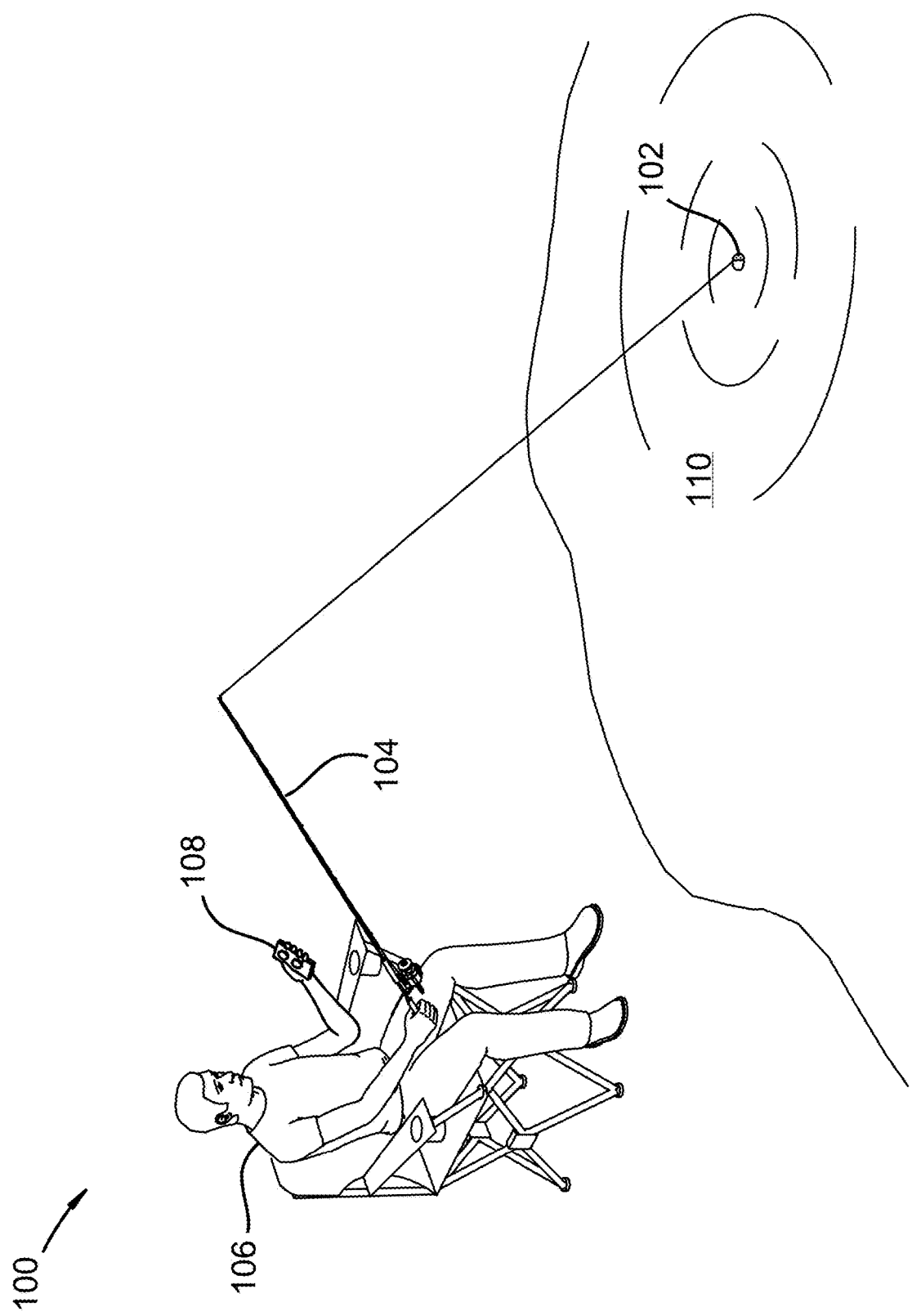
FIG. 1 shows a fisherman using the remote-controlled fishing bobber in accordance with an embodiment of the invention.

FIG. 1 shows a fisherman 106 using the remote-controlled fishing bobber system 102 in accordance with an embodiment of the invention. The fishing bobber 102 may sit in the water 110 and be controlled by a remote 108. The top portion or bottom portion of the fishing bobber 102 may be hemispherical or both may be hemispherical. The top portion of the fishing bobber 102 may be air-tight and float above the water 110 surface. The invention allows the fisherman 106 to choose his or her fishing location in a body of water. An inexperienced fisherman 106 may cast a fishing line and fail to reach a desired location and may use a remote 108 to direct the movement of the fishing bobber 102 to the desired fishing location in the water 110. Another use of the system may be when a current is active in the body of water 110 and the fisherman 106 wants to prevent the fishing bobber 102 and hook from drifting with the current. The remote 108 directs the movement of the fishing bobber 102 by signaling the pump to direct water flow, causing the fishing bobber 102 to move in the direction opposite of the water flow. The remote 108 also controls the independent rotation of the bottom portion of the fishing bobber 102 from the top portion of the fishing bobber 102 to alter the orientation of the water flow and moving direction. The speed of the movement of the fishing bobber 102 may also be controlled by the remote 108 which may be adjusted according to the strength of a current. Another use of the remote-controlled fishing bobber system 102 may be when a fisherman 106 chooses to direct the fishing bobber 102 to drag a lure in a manner imitative of the movement of a small fish to bait larger fish. The internal design of the propelling system with protective screens allow the fishing bobber 102 to be easily cleaned and protected from debris. The remote 108 may be a downloadable app onto an electronic device which uses the internet to control the movement of the fishing bobber 102. The remote 108 may also be a radio-wave controller, or an electronic controller included in the purchase of the fishing bobber system 100.

Figure 2:
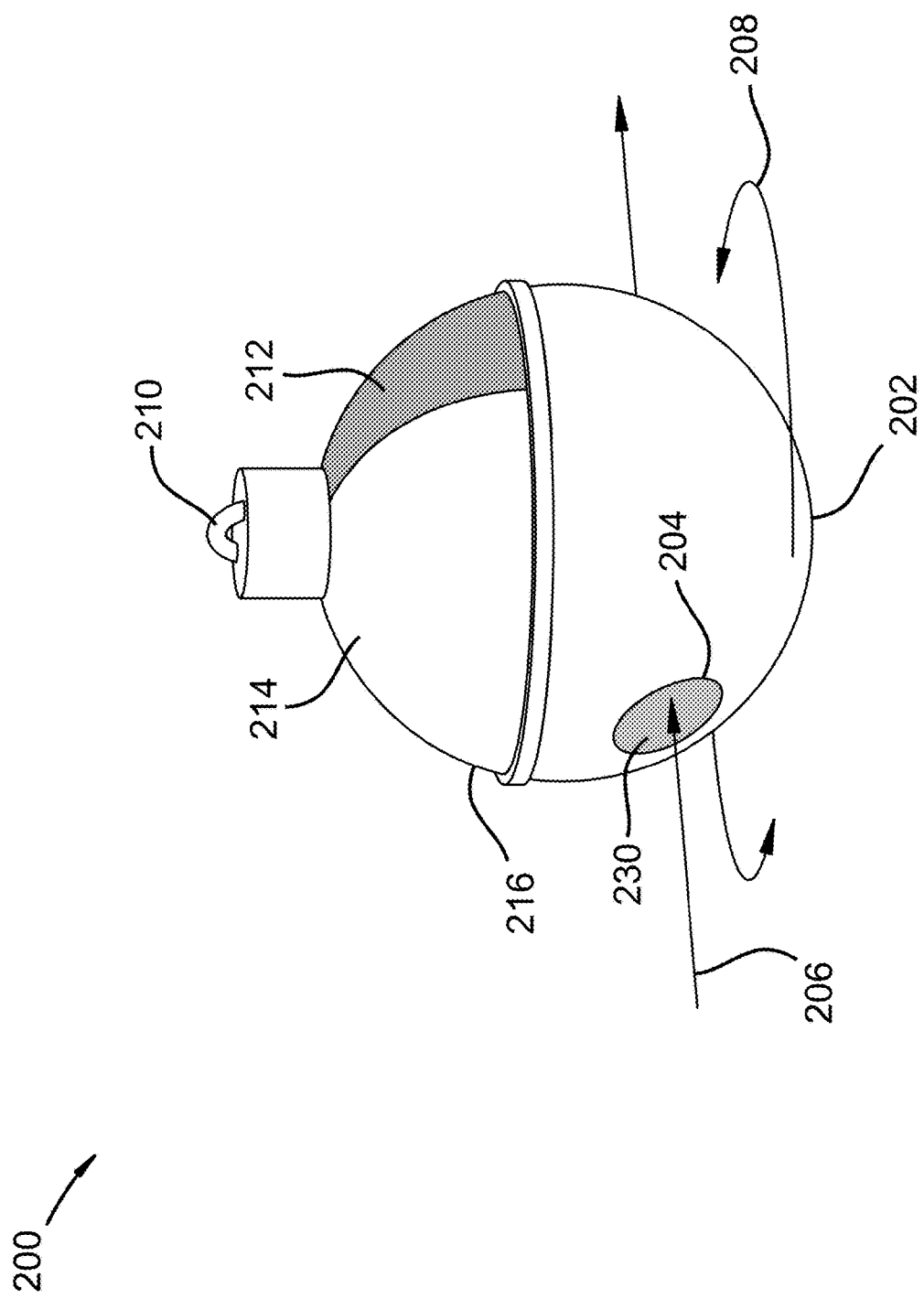
FIG. 2 shows a close view of the fishing bobber in accordance with an embodiment of the invention.

FIG. 2 shows a view of the fishing bobber 200 with the bottom portion 202 being independently rotational 208 from the top portion 216. A connector 210, which may be located on the top portion 216 allows the fishing bobber 200 to be attached to a fishing line. The two ports on opposing sides 204 may be covered by one or more protective screens 230. The one or more protective screens 230 may allow water flow 206 to pass freely through the two ports 204, but may act as a filter, blocking debris. The independent rotation 208 of the bottom portion 202 from the top portion 216 of the fishing bobber 200 may allow the orientation of the water flow 206 to change, changing the direction of propelled movement of the fishing bobber 200. While the water flow 206 may be moving in an eastward direction with a current to hold the fishing bobber 200 and hook in place, the fisherman may choose to move the fishing bobber 200 out of the current to a fish in a location with still or slower moving water. The independent rotation 208 of the bottom portion 202 of the fishing bobber 200 may be controlled by the remote to rotate by ninety degrees, allowing the water flow 206 to change to a northward direction and moving the fishing bobber 200 away from the current.

Figure 3:
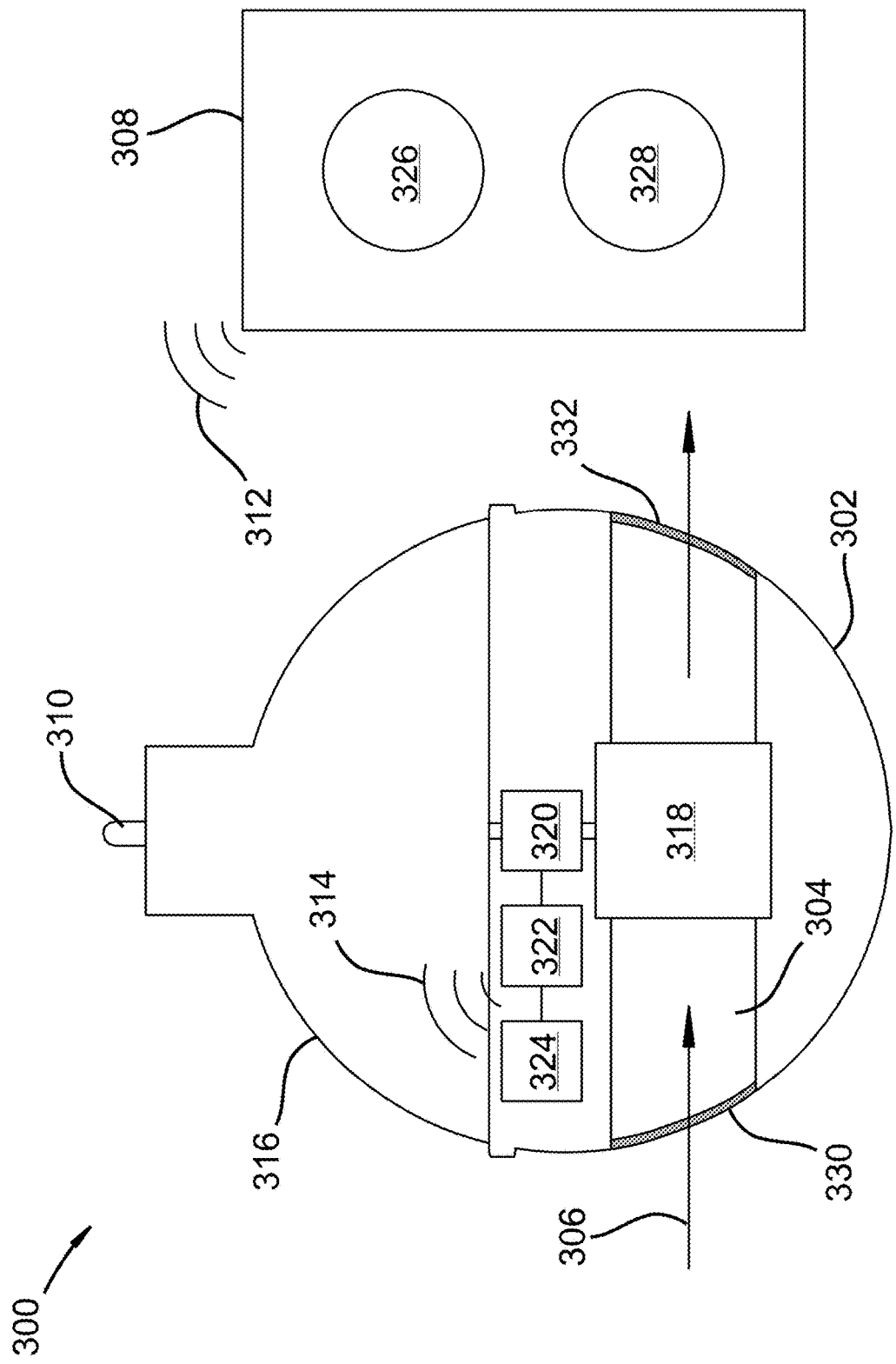
FIG. 3 shows a cross-cut view of the fishing bobber in accordance with an embodiment of the invention.

FIG. 3 shows a dissected view of the fishing bobber 300 with a view of the propelling system including the pump 318, motor 320, control circuitry 322, battery 324, and remote 308. The remote 308 may be a physical controller included in the purchase of the remote-controlled fishing bobber system 300, or it may be a downloadable app. The signal from the remote 312 may be via internet, radio waves, Ethernet, or any other wired or wireless connection to send signals to the control circuitry 314. The pump 318 may be located in the through channel 304. The motor 320, control circuitry 322, and battery 324 may be located in an air-tight location protected from water. The remote 308 may control the direction of the motor 320 which may reverse to control the independent rotation of the bottom portion 302 from the top portion 316 of the fishing bobber 300. Button 328 may cause the motor to power the pump 318 and direct water flow 306 by pulling water in through port and protective screen 330 and out through port and protective screen 332. Button 326 may reverse the motor 320 to power the independent rotation of the bottom portion 302 from the top portion 316 of the fishing bobber 300. The two ports and protective screens 330 and 332 may be equal in size and shape to allow water to flow freely and control pressure to propel the movement of the fishing bobber 300. When the water flow 306 matches the water current, the fishing bobber 300 is able to remain in place without drifting with water movement or the drifting of the fishing bobber 300 is reduced to be slower than the water current movement.

Figure 4:
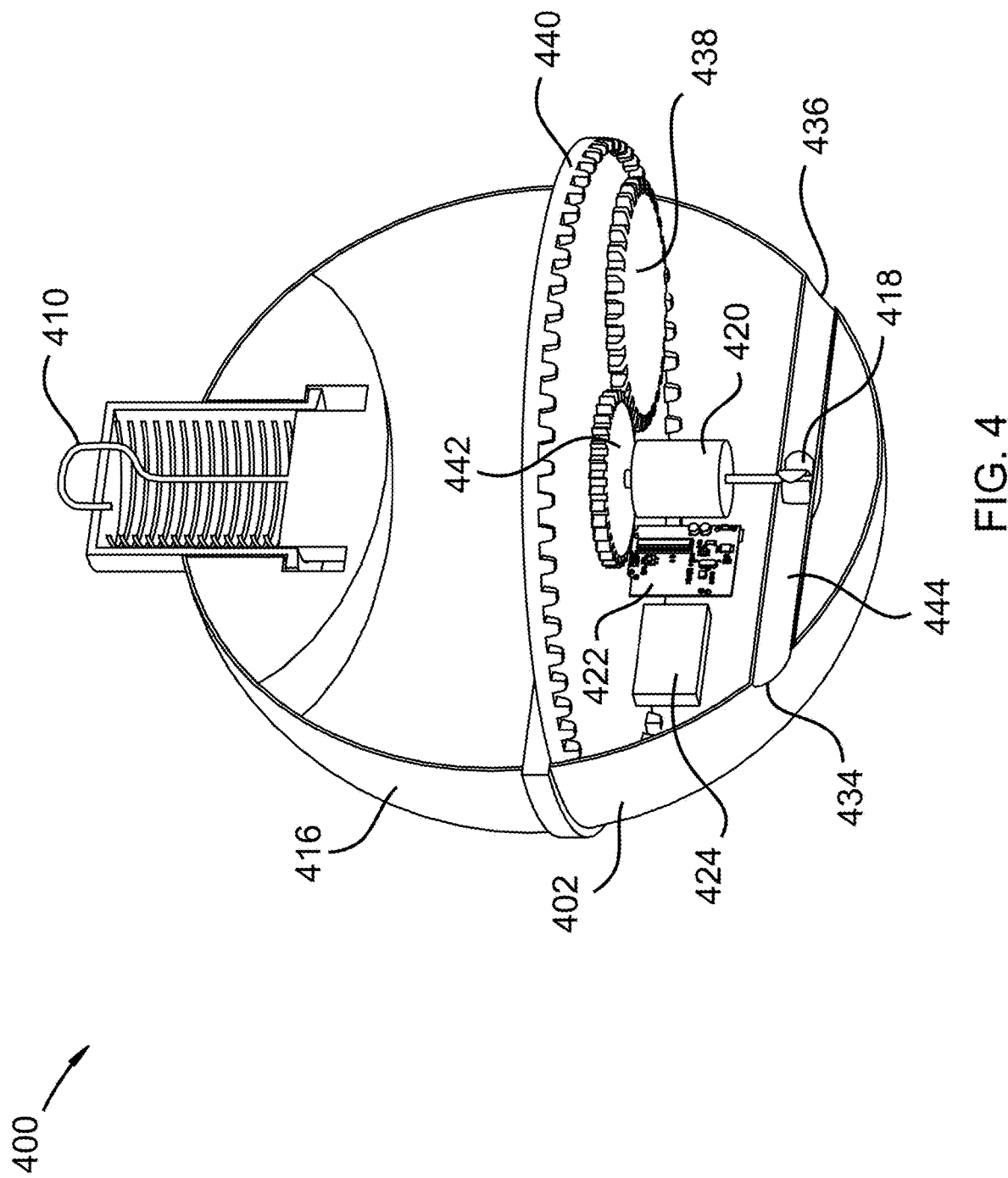
FIG. 4 shows a cross-cut view of the fishing bobber with the rotating gears in accordance with an embodiment of the invention.

FIG. 4 shows a cross-cut view of the fishing bobber 400, the propelling system, and gears in accordance with an embodiment of the invention. The top portion 416 may include a connector 410 to connect onto a fishing line. A bottom portion gear strip 440 may be attached to the inside and top of the bottom portion 402. The battery 424 may be located in a protected, air-tight location within the fishing bobber 400 to power the system along with the control circuitry 422 which may send signals to the motor 420. The motor 420 may power the pump 418 to pull water in through port 434 and out through port 436, allowing the fishing bobber 400 to be propelled through the water. The motor 420 in reverse may rotate the motor gear 442, turning the power gear 438, and the bottom portion gear strip 440 which may cause the independent rotation of the bottom portion 402 from the top portion 416 of the fishing bobber 400. The independent rotation of the bottom portion 402 from the top portion 416 of the fishing bobber 400 may include the bottom portion 402, the bottom portion gear strip 440, the two ports 434 and 436, and the through channel 444 rotating around the pump 418. But the pump 418, motor 420, battery 424, and control circuitry 422 may remain stationary in relation to the independent rotation of the bottom portion 402 from the top portion 416 of the fishing bobber 400. A fisherman may use the remote-controlled fishing bobber system to navigate the fishing bobber 400 and hook through a body of water filled with obstacles. The motor 420 may direct the pump 418 to rotate at a slower speed of the at least two speed options pulling the water flow through the through channel 444 with the current to propel against the current, which may slow the drifting of the fishing bobber 400 with the current. The current may pull the fishing bobber 400 toward a log or other obstacle in the body of water and a fisherman may reverse the direction of the motor 420 which may rotate the motor gear 442, turning the power gear 438, and the bottom portion gear strip 440 which may cause the independent rotation of the bottom portion 402 from the top portion 426 of the fishing bobber 400 at such an amount that the fisherman may turn the motor 420 back to the pump 418 and may choose a faster speed option of the at least two speed options to propel the fishing bobber 400 against the current and out of the way of the log. When the fishing bobber 400 is clear of the log, a fisherman may rotate the bottom portion of the fishing bobber again to align the through channel 444 with the current and may use the remote to direct the pump at a slow option of the at least two speed options to slow the drift of the fishing bobber 400 in the current as before.

Figure 5:
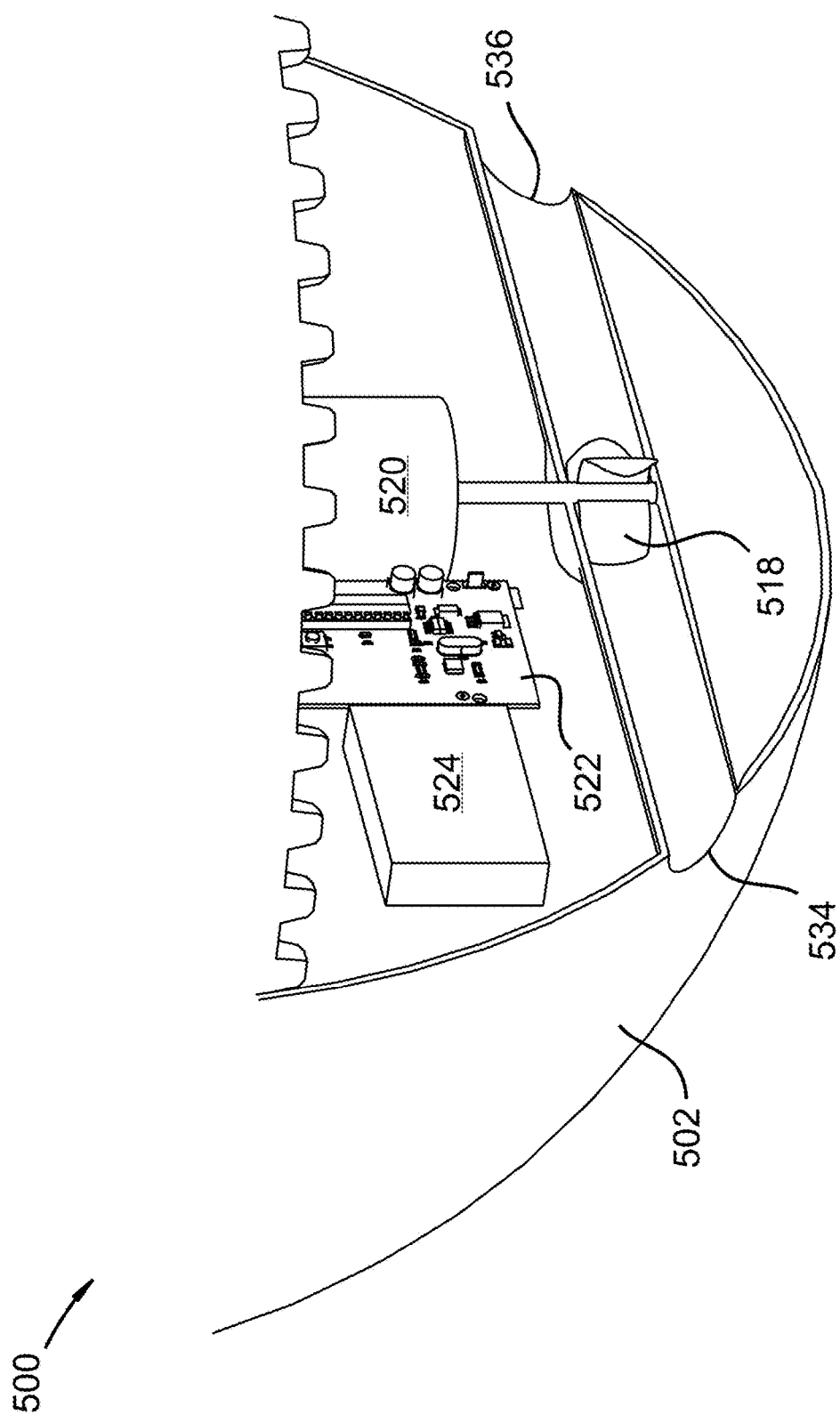
FIG. 5 shows the propelling system of the fishing bobber in accordance with an embodiment of the invention.

FIG. 5 shows the propelling system in the lower portion 502 of the fishing bobber 500 in accordance with an embodiment of the invention. The signal from the remote may reach the control circuitry 522 via internet, Ethernet, radio waves, or any other wired or wireless connection. The battery 524 may power the motor 520 as it receives directions from the control circuitry 522. The motor 520 may rotate the pump 518, pulling water through the port 534 and out the port on the opposing side 536.

Figure 6:
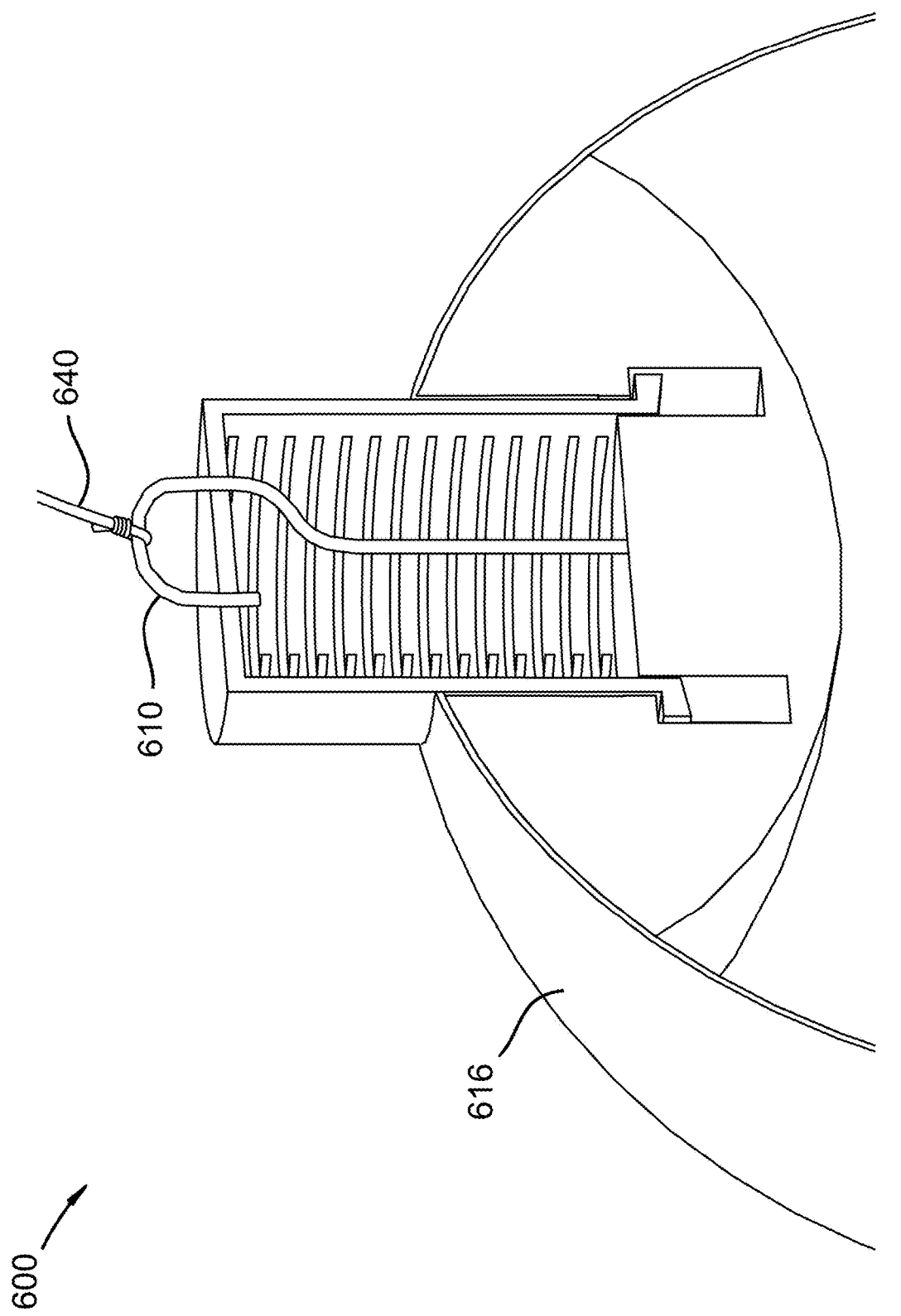
FIG. 6 shows the connector on the top portion of the fishing bobber in accordance with an embodiment of the invention.

FIG. 6 shows the connector 610 on the top portion 616 of the fishing bobber 600 in accordance with an embodiment of the invention. The fishing line 640 may be attached to the connector 610 at a desired position on the fishing line 640 to provide an appropriate length for the desired fishing depth.

The systems and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A remote-controlled fishing bobber system comprising:
   a fishing bobber with a bottom portion being independently rotational from a top portion;
   the bottom portion having two ports on opposing sides with a through channel connecting the two ports;
   one or more protective screens protecting the through channel;
   a propelling system comprising:
      a pump, a motor, a battery, control circuitry, and a remote control to direct a movement of the fishing bobber; and
   wherein the motor, in reverse, powers the independent rotation of the bottom portion from the top portion.

2. The system of claim 1, wherein the top portion of the fishing bobber or the bottom portion of the fishing bobber is hemispherical.

3. The system of claim 1, wherein the pump is positioned in the through channel.

4. The system of claim 1, wherein the one or more protective screens are positioned over the two ports on either side of the through channel.

5. The system of claim 4, wherein the one or more protective screens allow water to pass through freely while blocking debris.

6. The system of claim 5, wherein the one or more protective screens are constructed of a filtering material.

7. The system of claim 1, wherein the top portion of the fishing bobber is air-tight and floats above water.

8. The system of claim 1, wherein the remote control is a downloadable app or a physical remote.

9. The system of claim 8, wherein the independent rotation of the bottom portion from the top portion of the fishing bobber is directed by the remote control.

10. The system of claim 9, wherein the independent rotation of the bottom portion from the top portion of the bobber that is directed by the remote control is controlled to rotate at a measured degree amount.

11. The system of claim 10, wherein the through channel rotates around the pump with the independent rotation of the bottom portion from the top portion of the fishing bobber.

12. The system of claim 11, wherein the battery and control circuitry remain stationary with the motor and pump in relation to the independent rotation of the bottom portion from the top portion of the fishing bobber.

13. The system of claim 1, wherein the top portion includes a connector to be attached to a fishing line.

14. The system of claim 1, wherein the two ports are of similar size and shape.

15. The system of claim 1, wherein the motor is controlled by the remote control.

16. The system of claim 15, wherein the motor has at least two speed options controlled by the remote control.

17. The system of claim 16, wherein the battery, the control circuitry, and the motor are protected in an airtight location within the fishing bobber.

18. The system of claim 1, wherein the bottom portion has a gear strip on the inside of the top edge.

19. The system of claim 18, wherein the independent rotation of the bottom portion from the top portion is powered by the motor, a motor gear, a power gear, and the bottom portion gear strip.

* * * * *